Aug. 4, 1936.   A. BONGIOVANNI ET AL   2,049,684
EYEGLASS HANGER
Filed Sept. 10, 1935
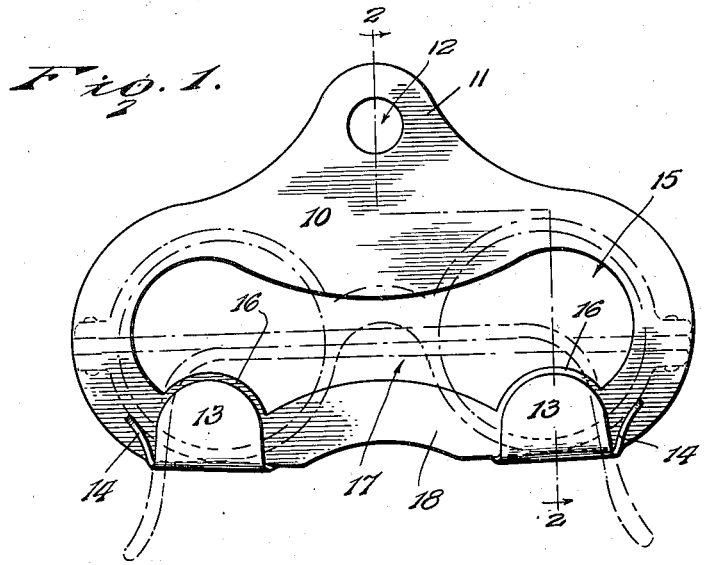
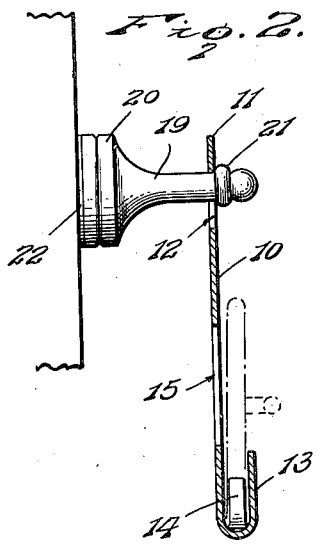
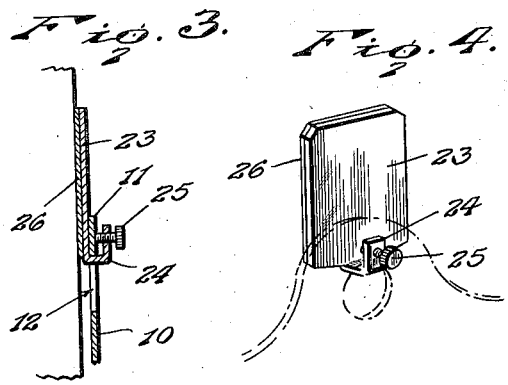
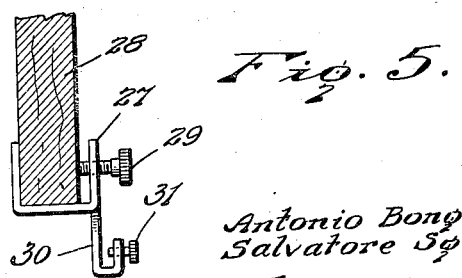
Inventors
Antonio Bongiovanni.
Salvatore Sgro.
By Thos. H. Johnston
Attorney Patented Aug. 4, 1936

2,049,684

UNITED STATES PATENT OFFICE 2,049,684

EYEGLASS HANGER

Antonio Bongiovanni and Salvatore Sgro, Philadelphia, Pa.; said Bongiovanni assignor to Frank B. Gummy, Philadelphia, Pa.

Application September 10, 1935, Serial No. 39,972

2 Claims. (Cl. 248—300)

This invention relates to an improved eyeglass hanger and while being well adapted for general use is, nevertheless, particularly intended for use in barber shops, beauty parlors and the like.

The invention seeks, among other objects, to provide a device which may be hung in a barber shop or the like to receive a pair of spectacles or eyeglasses while the owner thereof is being shaved, having his hair cut or receiving other ministrations of the barber so that the spectacles or eyeglasses will not be misplaced or become accidentally broken while, when the party is ready to leave, the spectacles or eyeglasses will be conveniently accessible.

The invention seeks, as a further object, to provide a device wherein a pair of spectacles or eyeglasses may be readily positioned therein and as conveniently removed, wherein the spectacles or eyeglasses cannnot accidentally fall out of the device and wherein provision will be made to obviate scratching of the lenses of the spectacles or eyeglasses by the device.

And the invention seeks, as a still further object, to provide a device which will be simple in construction, inexpensive to manufacture and efficient in practical use.

Other and incidental objects of the invention not specifically mentioned in the foregoing will appear during the course of the following description and in the drawing forming a part of this application, Figure 1 is a front elevation of our improved eyeglass hanger.

Figure 2 is a sectional view on the line 2—2 of Figure 1.

Figure 3 is a detail section showing a modified form of suspension device for the hanger.

Figure 4 is a perspective view of the suspension device shown in Figure 3.

Figure 5 is an edge elevation of another modified form of suspension device.

Insofar as we are aware, barber shops, beauty parlors and the like make, at present, no special provision for taking care of the eyeglasses or spectacles of their patrons. As a consequence, the patrons usually lay their eyeglasses or spectacles on some shelf or other convenient object with the result that they are sometimes lost, often misplaced and not infrequently broken. The present invention therefore seeks to obviate these annoyances by providing a device which will safely hold a pair of eyeglasses or spectacles in any convenient conspicuous place in a barber shop or the like while the owner of the eyeglasses or spectacles cannot wear them so that when the owner is ready to leave, his eyeglasses or spectacles will be conveniently at hand.

In carrying the invention into effect, our improved hanger is preferably stamped as a blank from suitable resilient sheet metal and includes a flat oblong body plate 10 rounded at its ends. Midway of its ends, the plate is widened at its upper side to provide an upstanding supporting tab 11 which is also rounded and, as will be observed, the semi-circular edges of the ends of the plate gradually merge with the edge of the tab. Formed in the tab is an opening 12.

Formed on the lower edge of the body plate 10 near the ends thereof are upstanding channel shaped ears 13 which, as seen in Figure 2, extend in spaced parallel relation to the plate. These ears are preferably rounded to conform to the contour of the plate 10 and tab 11 and formed on the outer edges of the ears at the bottom thereof are upstanding diverging stop fingers 14.

Formed in the plate 10 medially thereof is a double-spatulate opening 15 the enlarged ends of which are centered medially of the ears 13 and rising from the lower edge of said opening into the enlarged ends thereof are oval guard flanges 16 disposed opposite the ears and somewhat higher than the free ends thereof. Between its ends, the opening 15 is provided with a reduced neck 17 while between the ears 13, the body plate 10 is provided with a concave edge which, in conjunction with said neck, defines an arcuate strap 18 connecting the ears. With the exception of the edges of the tongues 14, all edges are curved so that the device is thus symmetrical and presents an attractive appearance.

In conjunction with the body plate 10 of the device we preferably provide a post 19 having an enlarged circular base 20 while near its outer end, said post is provided with a collar 21. Fixed to the base is an adhesive disk 22 which may be moistened for attaching the post to a mirror, for instance, or other convenient object. The post 19 is, as shown in Figure 2, adapted to extend through the opening 12 of the tab 11 for supporting the device in position for use and, as will be noted, the collar 21 will prevent accidental displacement of the device from the post.

In Figures 3 and 4 of the drawing we have shown a modified form of suspension member embodying a rectangular plate 23 provided at its lower edge with a hook 24 which is adapted to extend through the opening 12 of the tab 11 of the device and is equipped with a set screw 25 adapted to impinge the tab so that the device will be firmly supported by the plate 23. Fixed to said plate is an adhesive element 26 like the disk 22 and adapted to serve the same purpose.

In Figure 5 we have shown another modified form of suspension device embodying a channel member 27 adapted to straddle the edge of a piece of glass or the like, as conventionally shown at 28, and carried by said member is a set screw 29 for attaching the member to the glass. Depending from the member 27 is a hook 30 and mounted on said hook is a set screw 31, the hook 30 and set screw 31 being for the same purpose as the hook 24 and set screw 25 previously described.

As will now be seen, the device may be readily suspended in any convenient conspicuous place within a barber shop, beauty parlor or the like when, as suggested in dotted lines in Figure 1, a pair of spectacles or a pair of eyeglasses may be positioned within the ears 13 to be safely supported by the device. As brought out in Figure 2, the ears 13 are adapted to more or less snugly receive the spectacles while the lenses thereof will be disposed at the enlarged ends of the opening 15. Scratching of the lenses, particularly toric lenses, will thus be obviated while, however, the flanges 16 will prevent undue tilting of the spectacles within the ears 13. The device may, of course, be of any approved length but preferably, will be of such dimensions that the fingers 14 will closely approach or abut the rims of the eye-pieces of the frame of the spectacles. The fingers will thus not only serve to center the spectacles upon the device as well as prevent accidental endwise displacement of the spectacles from the device but will also tend to yieldably grip the rims of the eye-pieces of the frame of the spectacles to prevent vibration of the spectacles such as might cause scratching of the lenses thereof. As will be observed, the lower edge of the bridge of the frame of the spectacles will normally be exposed at the neck 17 of the opening 15. Consequently, an index finger may be readily inserted through said opening beneath the bridge, when the bridge may be readily grasped between the thumb and said finger and the spectacles easily and quickly removed from the hanger.

In the present instance, we have shown and described the improved hanger as preferably formed of suitable resilient sheet metal. Still, as will be appreciated, the device may, if so desired, be formed of paper or other suitable material and we do not, therefore, wish to be limited in this respect.

Having thus described the invention, we claim:

1. An eyeglass hanger including a body plate having upturned ears thereon spaced apart to receive and support the lenses of a pair of eyeglasses, the body of said plate forming a background for the lenses and being apertured above the ears to accommodate portions of said lenses whereby to obviate scratching thereof and having its intermediate portion apertured to provide free access to the bridge of the eyeglasses beneath the bridge to facilitate grasping of the bridge.

2. An eyeglass hanger including an oblong body plate provided with upturned ears extending in spaced relation to the plate and spaced apart to receive and support the lenses of a pair of eyeglasses, and upstanding stop fingers formed on the ears for limiting the eyeglasses against displacement and diverging for guiding the eyeglasses into position between the ears and said plate, the body of said plate forming a background for the lenses and being provided with an elongated longitudinally extending opening enlarged at its ends to accommodate portions of said lenses whereby to obviate scratching thereof and having its intermediate portion exposing the bridge of the eyeglasses to provide free access to the bridge therebeneath and facilitate grasping of the bridge.

ANTONIO BONGIOVANNI.
SALVATORE SGRO.